United States Patent [19]
Sherwood et al.

[11] 3,800,005
[45] Mar. 26, 1974

[54] POLYMERIZATES OF HYDROXYETHERIFIED PHENOLIC RESIN ESTERIFIED WITH UNSATURATED POLYCARBOXYLIC ACID AND LAMINATES THEREFROM

[75] Inventors: Donald W. Sherwood; Richard B. Tideswell, both of Buffalo; Francis M. Kujawa, Tonawanda, all of N.Y.

[73] Assignee: Hooker Chemical Corporation, Niagara Falls, N.Y.

[22] Filed: July 14, 1971

[21] Appl. No.: 162,676

[52] U.S. Cl.............. 260/848, 161/194, 161/198, 260/14, 260/17.2, 260/38, 260/52, 260/59, 260/844
[51] Int. Cl. ...... C08g 37/20, C08g 5/18, C08f 3/48
[58] Field of Search............ 260/844, 837 R, 52, 59, 260/848, 77

[56] References Cited
UNITED STATES PATENTS

| | | | |
|---|---|---|---|
| 3,420,914 | 1/1969 | May | 260/837 |
| 3,248,276 | 4/1966 | Bean et al. | 161/195 |
| 3,331,730 | 7/1967 | Bean et al. | 260/844 |
| 3,408,422 | 10/1968 | May | 260/837 |
| 2,826,562 | 3/1958 | Shokal | 260/77 |
| 3,055,869 | 9/1962 | Wilson et al. | 260/77 |
| 2,035,528 | 3/1936 | Brubaker | 260/77 |

*Primary Examiner*—John C. Bleutge
*Attorney, Agent, or Firm*—Peter F. Casella; James F. Mudd; Monroe D. Edelman

[57] ABSTRACT

New thermoplastic polyester resin compositions and processes for the preparation thereof are provided. The new compositions comprise mixed polyesters of alpha beta ethylenically unsaturated dicarboxylic acids which are esterified on the one side with a monofunctional alcohol having a boiling point above about 135°C and on the other side with a polyfunctional oxyalkylated novolak resin containing substantially no free phenolic hydroxyl groups. The polyesters when copolymerized with ethylenically unsaturated monomers produced thermoset polymers which are characterized by excellent resistance to caustic alkalis.

20 Claims, No Drawings

POLYMERIZATES OF HYDROXYETHERIFIED PHENOLIC RESIN ESTERIFIED WITH UNSATURATED POLYCARBOXYLIC ACID AND LAMINATES THEREFROM

This invention broadly relates to new polymers and a novel process for their preparation. In some of its more specific aspects, the invention further relates to the preparation of improved castings, laminates, and reinforced plastic articles comprising the polymers of the invention and to the products thus prepared.

BACKGROUND OF THE INVENTION

The use of monofunctional materials in polymers generally has not received acceptance in the art since materials terminate the polymer chains. However, it has been discovered that there is a variety of monofunctional materials which when combined with certain other materials result in an improved polymer. In accordance with one important aspect of the present invention, suitable polyfunctional materials may be used with monofunctional material and a second polyfunctional material to produce desirable plastic products that are characterized by, among other things, low cost, high strength, convenient handling characteristics, freedom from undue discoloration, and most importantly excellent resistance to chemical reagents.

U.S. Pat. No. 3,248,276 discloses resinous products derived from a phenol aldehyde condensation product which had been oxyalkylated and then esterified with an alpha-beta unsaturated dicarboxylic acid anhydride. The esterified products are cured by cross-linking with an ethylenically unsaturated monomer. The resultant polymerized products are characterized by high numbers and consequently are soluble in alkaline solutions. This properly results in a high degree of susceptibility to attack by alkaline reagents and thus the polymers of this patent are not suitable for use in alkaline environments. It is disclosed in this patent also that monobasic acids can be used to modify the hydroxyalkylated resins. It is evident that such monofunctional modifiers react with the hydroxy moieties of the oxyalkylated resin and are used to replace part but not all of the alpha-beta unsaturated dicarboxylic acid. Such modified polymers may also be characterized by terminal acid groups which as indicated above reduce the resistance of the final polymer to alkaline reagents.

Phenolic condensation products which are fusible and soluble, such as novolaks or resoles, are useful in the process of the present invention as the polyfunctional material which may be reacted with the second polyfunctional material. As a typical example, a novolak resin which is a condensation product of a phenol and formaldehyde may be reacted with polyfunctional material of such a nature that the hydroxyl groups of the novalak are blocked from further reaction by esterification and/or etherification and then the resinous resultant product may be polymerized through remaining functional groups of the esterifying and/or etherifying materials. By the esterification or etherification of the free reactive phenolic hydroxyl groups of the novolak, the remaining ortho or para positions of the phenolic residues are rendered inactive to normal condensation polymerization with substances such as aldehydes or ketones.

Phenolic resins have been used in laminating and molding operations of the prior art where high temperatures and pressures are necessary in order to obtain suitable products because in condensation polymerization, water or ammonia is eliminated. The resultant products had only fair flame resistance, and phenolic resins also are generally dark colored and darken to even deeper hues on exposure to light, exhibit poor alkali resistance, and have other serious disadvantages. The art has long sought polymers which combine the desirable properties of the phenolic resins with other desirable properties such as light colors, resistance to chemical reagents, and an ability to be cured to high-strength products by addition polymerization without elimination of water, ammonia or other byproduct, at low or contact pressure, and which may be produced at low cost. However, prior to the present invention, entirely satisfactory polymers having the above characteristics were not available.

OBJECTS OF THE INVENTION

It is an object of the present invention to provide a novel process for the preparation of improved polymers based on fusible, solvent soluble condensates of a phenol and an aldehyde, and to provide the polymers thus prepared.

It is a further object of the present invention to provide a novel process for preparing improved curable thermoplastic polymers from phenol-aldehyde condensates, a process for preparing thermoset polymers therefrom, and to provide the thermoset polymers thus prepared.

A further object of the present invention is to prepare improved polyester resins from phenol-aldehyde condensates, and to provide the polymers thus prepared.

Another object of the present invention is to provide a novel polymerizable composition of matter comprising an ethylenically unsaturated polymer of the invention and an ethylenically unsaturated monomer copolymerizable therewith.

A still further object of the present invention is to provide improved castings, laminates, reinforced plastic articles.

Other objects and advantages of the present invention will be apparent to those skilled in the art upon reference to the following detailed description and the examples.

DESCRIPTION OF THE INVENTION

In accordance with one important variant of the present invention, it has been discovered that fusible, solvent soluble condensation products of a phenol and an aldehyde containing condensate units having reactive phenolic hydroxyl groups may be reacted through the phenolic hydroxyl groups with a compound which provides oxyalkyl chains and which in turn may be reacted with a compound which is ethylenically unsaturated and then with a monofunctional alcoholic material, to thereby provide curable thermoplastic polymers, which on curing produce improved thermoset polymers having the desirable properties mentioned herein.

Soluble, fusible phenol-aldehyde condensates suitable for use as starting materials in practicing the present invention are well known to the art and may be prepared by well known methods. The phenol-aldehyde condensate should be soluble in organic solvents such as acetone and it should not be advanced to the insoluble "C" stage or resite stage. When the phenol is phenol itself and the aldehyde is formaldehyde, one type of condensate which is highly satisfactory contains a mixture of condensation units which may be exemplified by the following formula:

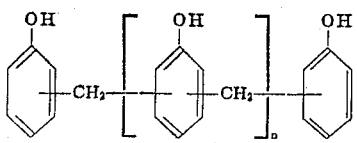

wherein n represents a numeral varying from 0 to 10, and often higher, provided the resin is fusible and acetone or organic solvent-soluble. In the usual condensate, n generally has an average value of about 0.3 to 1.5. Preferably, the phenol-aldehyde condensate is a novolak, which contains more than one mole of phenol per mole of aldehyde.

Examples of phenols which may be used in preparing phenol-aldehyde condensates for use in practicing the invention include phenol itself or substituted phenols having the following general formula:

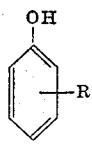

where R may be H, F, Cl, Br or a suitable substituent selected from the following:

a. Alkyl groups of 1 to 18 carbon atoms in any of their isomeric forms and substituted on the phenolic nucleus in the ortho, meta or para positions;

b. Alicyclic groups of 5 to 18 carbon atoms such as cyclohexyl, cyclopentyl, methylcyclohexyl, butylcyclohexyl, etc;

c. Aryl or aralkyl groups of six to 18 carbon atoms such as phenyl, alpha-methylbenzyl, benzyl, cumyl, etc;

d. Alkyl, alicyclic, aryl and aralkyl ketones wherein the hydrocarbon is defined hereinbefore.

e. Alkyl, alicyclic, aryl and aralkyl carboxylic groups wherein the hydrocarbon is defined hereinbefore.

Suitable substituted phenols include the following:
Para-tertiary-butylphenol,
Para-secondary-butylphenol,
Para-tertiary hexylphenol,
Para-isooctyl-phenol,
Para-phenylphenol,
Para-benzylphenol,
Para-cyclohexylphenol,
Para-decyl-phenol,
Para-dodecyl-phenol,
Para-tetra-decyl-phenol,
Para-octa-decyl-phenol,
Para-nonyl-phenol,
Para-methyl-phenol,
Para-beta-naphthyl-phenol,
Para-alpha-naphthyl-phenol,
Para-pentadecyl-phenol,
Para-cetyl-phenol,
Para-cumyl-phenol,
Para-hydroxy acetophenone,
Para-hydroxy benzophenone,
Para-chlorophenol,
Para-bromophenol,
Ortho-fluorophenol
a phenol alkylated with limonene, a phenol alkylated with oleic acid, as well as the corresponding ortho and meta derivatives such as, ortho chlorophenol, meta-butyl phenol, and ortho-butyl phenol, as well as mixtures thereof.

From the foregoing, it is apparent that substantially any phenol may be used in practicing the present invention provided it has a reactive phenolic hydroxyl group and is capable of reacting with aldehydes such as formaldehyde to produce a condensate. The pure refined phenols may be used, but this is not always necessary. For instance, phenols may be alkylated and then reacted with an aldehyde as the crude product which may contain some polyalkylated as well as unalkylated phenols. Mixtures of phenols mentioned herein also may be used.

In producing the parent phenol-aldehyde condensates, any suitable aldehyde or mixtures of aldehydes capable of reacting with a phenol and having not more than, for example, eight carbon atoms is satisfactory provided it does not contain a functional group or structure which is detrimental to the resinification reaction or with esterification or oxyalkylation of the resin. The preferred aldehyde is formaldehyde, which may be in aqueous solution or in any of its low polymeric forms such as paraform or trioxane. Other examples of aldehydes include acetaldehyde, propionaldehyde, butyraldehyde, benzaldehyde, furfural, 2-ethylhexanal, ethylbutyraldehyde, heptaldehyde, glyoxal, etc.

The amount of aldehyde to be condensed with the phenol may be varied to prepare novolaks of varying molecular weights and the viscosity of the finished resin can be controlled by the mol weight of the novolak. Preferably, the amount of aldehyde varies from 0.2 to 1.0 mol per mol of the phenol when a mono or difunctional phenol is used. In instances where a trifunctional phenol is used, the preferred upper limit of aldehyde can be about 0.85 mol per mol of phenol so as to prevent formation of insoluble and infusible condensates.

In instances where a novolak is prepared using the above described ratios of aldehyde to phenol, it is preferred that the aldehyde and phenol be reacted using an acid catalyst such as sulfuric, hydrochloric or oxalic acid, but basic catalysts also may be used. In some instances, catalysts may not be necessary. Examples of alkaline catalysts include ammonia, amines and quaternary ammonium bases. Wetting agents of the anionic type such as sodium alkylaryl-sulfonate, may speed up the reaction when weak acids are used and also may be present.

In instances where a resole is prepared, more than one mol of formaldehyde per mol of phenol may be useful. The specific phenols and aldehydes which can be used are described above, and the alkali catalysts described above also are useful. The resoles have carbinol groups as well as phenolic hydroxyl groups which can be reacted with the reagents to be discussed hereinafter.

In accordance with the present invention, improved polymers can be prepared which preferably contain substantially no free reactive phenolic groups (less than about 0.5 percent of the phenolic hydroxyl, for example) present originally in the phenol-aldehyde condensate. The phenol-aldehyde resin can be reacted with a suitable substance designed to etherify or esterify the phenolic hydroxyl groups provided that at least one of the phenolic hydroxyl groups present in each phenol-aldehyde condensate unit is reacted with a substance or substances which are in turn reacted with an ethylenically unsaturated compound.

It is preferred to first hydroxyalkylate the phenolic hydroxyl goups, and then to esterify the resultant groups with a dicarboxylic acid anhydride. The preferred method of hydroxyalkylation is by reaction with compounds containing a mono oxirane ring. Such oxirane compounds include ethylene, propylene, butylene, styrene and cyclohexene oxides, glycide and epichlorohydrin. Many other monoepoxides can be used, but the alkylene oxides containing not more than six carbons are generally used. Additional useful compounds are phenyl glycidyl ether and related compounds prepared from the reaction of epichlorohydrin and monofunctional alkylated and halogenated phenols such as pentachlorophenyl glycidyl ether.

Catalysts for the reaction of the oxirane ring compounds and phenolic hydroxyl groups are alkali or alkaline earth hydroxides, primary amines, secondary amines, tertiary amines, or basic alkali salts. These include sodium, potassium, lithium, calcium and barium hydroxides, amines such as methyl, dimethyl, diethyl, trimethyl, triethyl, tripropyl, dimethyl benzyl, dimethyl hydroxyethyl, dimethyl-2-hydroxypropyl and the like, and salts of strong bases and weak acids such as sodium acetate or benzoate. The reaction may be carried out at temperatures of 50° to 250° centigrade, and preferably in the absence of solvents, although solvents may be used for the higher molecular weight resins to reduce viscosity.

The phenolic hydroxyl of the novolaks or resoles may also be hydroxyalkylated by reacting alkylene halohydrins with the phenolic hydroxyl using equivalent amounts of an alkali metal hydroxide to bring about the reaction. Suitable alkylene halohydrins are ethylene chloro or bromohydrins, propylene chloro or bromohydrins, 2,3-butylene chloro or bromo-hydrins, glyceryl chloro or bromo-hydrins.

Another method for hydroxyalkylating novolaks is reaction with alkylene carbonates such as ethylene carbonate and propylene carbonate, using a catalyst such as potassium carbonate.

It is preferred that the novolaks or resoles be reacted until substantially all of the reactive phenolic hydroxyl groups have reacted (leaving preferably less than 0.5 percent of the phenolic hydroxyls unreacted). This is desirable to prevent inhibition of the reaction of the unsaturated esters with ethylenically unsaturated monomers and to give oxidation and light stability in the resultant product. At least 1 mol of alkylene oxide or other etherifying or esterifying agent is required per mol of phenolic hydroxyl. However, resins prepared by reaction with up to 3 mols of alkylene oxide per mol of phenolic hydroxyl are useful. It is required that there be at least one hydroxyalkyl group per condensate molecule.

A variety of acids, acid halides, acid anhydrides, etc., or mixtures thereof may be used for reaction with the hydroxyalkyl phenylethers of novolaks or resoles such as prepared in accordance with the invention. For example, the hydroxy-alkyl novolaks may be esterified with 0.5 to 1.0 mol of an alpha, beta-unsaturated dicarboxylic acid anhydride per hydroxyl equivalent. The carboxylic acids and the corresponding acid chlorides and acid anhydrides may include maleic, chloromaleic, ethylmaleic, itaconic, citraconic, xeronic, and pyrocinchoninic, either alone or as a mixture. The resins may be modified for special properties by using some polycarboxylic anhydrides which are not alpha, beta-unsaturated along with the above-mentioned anhydrides. For example, 1,4,5,6,7,7-hexachlorobicyclo-(2.2.1)-5-heptene-2,3-dicarboxylic anhydride and tetrachlorophthalic impart flame resistance. Examples of other useful acids, acid chloride and anhydrides include phthalic, tetrahydrophthalic, cyclopentadiene and methyl cyclopentadiene-maleic adducts, succinic, tricarballylic, gluconic, dodecyl succinic, etc.

The esterification of the hydroxyether derivative is preferably carried out at a temperature in the range of about 100° to 150° centigrade, although higher and lower temperatures can be used. The esterification reaction can be carried out at atmospheric or subatmospheric pressure. When polycarboxylic acids are used, the progress of the esterification reaction can be monitored by measuring the quantity of water of esterification that is produced. Small quantities of toluene or xylene can be used as azeotroping agents to facilitate removal of the water. When acid chlorides are used, it is preferred to use solvents during the reaction. The acid chloride can be dissolved in a suitable solvent, such as benzene and methylene dichloride, and added to the hydroxyether derivative also dissolved in the same or a similar solvent. The reaction can be conducted at a temperature up to the boiling point of the solvent. The solvent can be readily removed such as by stripping at the completion of the reaction. The progress of the reactions involving the acid chlorides can be monitored by measuring the quantity of hydrogen chloride evolved during the course of the esterification. Moreover, in the reactions involving the acid chlorides, it is advantageous to use a hydrogen halide acceptor such as amines and strong bases. Preferred acceptors are amines such as pyridines, and triethylamine.

Preferably the esterification of the hydroxyether derivative is carried out using an anhydride of the ethylenically unsaturated dicarboxylic acid and especially maleic anhydride is used. Under the relatively mild conditions of the esterification reaction the anhydride proceeds rapidly and substantially completely to the formation of the monoester. On the other hand, when the dicarboxylic acid is used, higher temperatures and/or azeotroping solvents are required. When higher temperatues are used, the reaction may be difficult to control and the mono ester formed may continue to react to form high molecular products and gelling of the resinous mass. Azeotroping solvents require an additional step to remove them and thus adds to the cost of the overall process. Similar considerations are involved when acid halides are used. The reactivity of such reactants are such as to make control of the esterification and prevent of gellation difficult.

The resultant monoester of the oxyalkylated novolak and alpha-beta-unsaturated dicarboxylic acid is next reacted with a mono functional alcohol. It is believed that the monofunctional alcohol serves to terminate the polymer chain and thus to prevent premature gellation of the resin due to cross-linking in the condensation poylmerization reaction. The monofunctional alcohols suitable for use in this invention should boil at above about 135° centigrade and preferably at about 150° centigrade or above, should not contain free phenolic hydroxyl substituents or any other substituents which would deleteriously affect the oxidation and/or light stability of the resultant product. As examples of the monofunctional alcohol product the following can be named:

n-hexanol
2-ethyl hexanol
decanol
dodecanol
tetrahydrofurfuryl alcohol
phenoxyethanol
para chlorophenoxyethanol
phenoxypropanol-2
phenoxypropanol-3
tri chlorophenoxy propanol-2
tri bromophenoxy propanol-2
2-naphthoxy ethanol
B-naphthoxypropanol-2
phenoxy-polyethoxy alcohol
phenoxy-polyisoproproxy alcohol Phenoxy propanol-2, which has the formula:

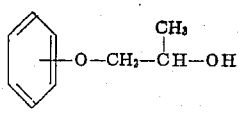

is preferred because of its general effectiveness, low cost and ready availability. Halogen substituted phenoxy alkanols, e.g., tribromophenoxy propanols are useful, either per se or in admixture with phenoxy propanol-2, as a means of incorporating fire retardant characteristics into the corrosion resistant resins of the invention.

Although it is preferred to carry out the novel process of our invention by reacting the oxyalkylated novolac with the alpha beta unsaturated dicarboxylic acid anhydride and to react the resulting half-ester with the monofunctional alcohol, the sequence of steps can be altered by first reacting the monofunctional alcohol with the dicarboxylic acid anhydride to prepare the half-ester and to react this product with the oxyalkylated novolac.

The properties especially the flexibility of the mixed unsaturated polyesters of this invention can be advantageously modified by incorporating into the esterification reaction a relatively small quantity of an alkylene glycol having from 2 to 16 carbon atoms per molecule. By the term "alkylene glycol," we include the well-known polyalkylene ether glycols. Suitable alkylene glycols are ethylene, diethylene, triethylene, tetramethyl glycols, butylene glycols, propylene, dipropylene and tripropylene glycols, pentylene glycols, neopentyl glycols, 2-methyl-2-ethylpropane diol-1,3,2,2-diethyl propane diol-1,3, and bis(1,4-hydroxymethyl) cyclohexane. Polyols, such as glycerol, trimethylol propane and pentaerithritol can be used for this purpose also. In a avariant of the process of this invention, the alkylene glycol or polyol may be added to the hydroxyalkylated novolak component prior to the reaction thereof with the dicarboxylic acid component. The amount of such component used can vary up to a ratio of about five moles of polyol per mole of hydroxyalkylated novolak and especially the ratio used is from 0.3 to 4 moles of polyol per mole of hydroxyalkylated novolak.

The monofunctional alcohol should be used in substantially molar equivalent amounts, that is, in sufficient amount to react substantially completely with the half ester of the oxyalkylated novolac-dicarboxylic acid product, or, in the alternate procedure, in sufficient amount to prepare the half-ester of the dicarboxylic acid. Preferably from about 0.9 to 1.2 moles of the monofunctional alcohol is used, and especially this amount is from about 1.0 to about 1.1 moles of alcohol per mole of dicarboxylic acid reactant.

The reaction of the oxyalkylated novolak dicarboxylic acid half-ester product and the monofunctional alcohol is preferably carried at a temperature within the range of about 150° centigrade to about 225° centigrade, although lower or higher temperatures may be used. The reaction is preferably carried out in an inert atmosphere. Most conveniently this inert atmosphere is obtained by passing a slow steady stream of inert gas, e.g., nitrogen, over the reaction mixture. The reaction is monitored most conveniently by following the reduction of the acid number of the reaction mass. When this parameter of the product is about 30 or less the esterification reaction is essentially complete.

This reaction requires, in general, a period of several hours, from about two to about 20 hours, depending upon the size of the batch, temperature of heating and oher well known factors.

In the alternate procedure, when the monofunctional alcohol is esterified with the dicarboxylic acid component the reaction is effected at somewhat lower temperatures, for example between about 100° and about 150° centigrade, preferably, in this instance also, in an inert atmosphere. This esterification reaction is generally completed within a period of from one half to about three hours. However, it is not, generally, necessary to carry this reaction to complete formation of the mono-ester since the following step, the esterification of the oxyalkylated novolac and the dicarboxylic acid half ester is carried out under conditions such that any unreacted monofunctional alcohol which remains will undergo esterification during this second step.

The resultant ethylenic polymer compositions prepared by either of these two alternate procedures comprises thermoplastic mixed esters of the alpha beta ethylenically unsaturated dicarboxylic acid, the acid being esterified on the one side by the monofunctional alcohol and on the other side by the oxyalkylated polyfunctional novolak resin. The polymer composition is readily soluble in and copolymerizable with ethylenically unsaturated monomers and when so copolymerized produce thermoset polymers which are characterized by excellent resistance to caustic alkalis.

The polyester composition is quite complex due to the polyfunctional character of the oxyalkylated novolak resin. Thus, the composition comprises polyesters of the structure
where R and n have the above described meaning and the ethylenically unsaturated acid is maleic acid and the oxyalkyl group is derived from 1,2-propylene oxide.

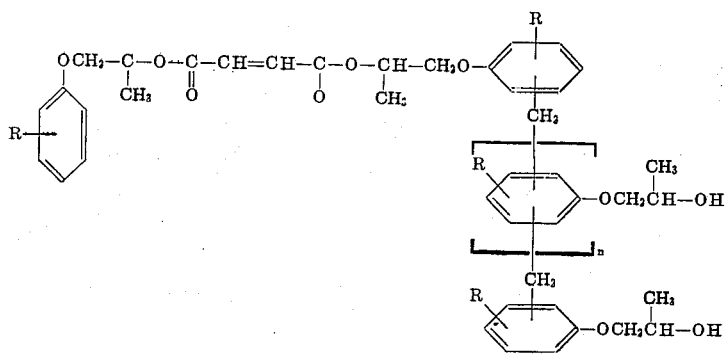

Each of the remaining hydroxyl groups in the above formula may be esterified also with a carboxyl moiety of the dicarboxylic acid and then with a oxyalkylated novolak moiety or a monofunctional alcohol moiety to form polyesters of greater complexity. However the monofunctional alcohol moiety,

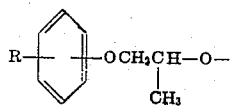

serves to terminate the polyester chain and thus to prevent the build up of the molecular weight of the polyester to the point where the gellation of the polyester mass would occur.

The resultant thermoplastic ethylenic polymer can be cured by cross-linking in the presence of a catalytic amount of a conventional polymerization catalyst for addition polymerization of ethylenically unsaturated materials, including free radical catalysts such as benzoyl peroxide and other organic peroxides. The polymer may also be cured by copolymerization with an ethylenically unsaturated monomeric material copolymerizable therewith, and preferably in the presence of a catalytic amount of a polymerization catalyst such as mentioned above.

The ethylenically unsaturated monomers which may be used in curing or cross-linking the ethylenically unsaturated polymers of the present invention may be varied widely. While other materials may be used, it is preferred that addition polymerization be practiced since no by-product ammonia, water, etc., is formed and the problems resulting therefrom are not experienced. The monomers useful in curing the thermoplastic unsaturated polymers include vinylic compounds or mixtures thereof capable of cross-linking ethylenically unsaturated polymer chains at their points of unsaturation and usually they contain the reactive group

Specific examples include styrene, chlorostyrenes, methyl styrenes such as alpha methyl sytrene, p-methyl styrene, divinyl benzene, indene, unsaturated esters such as: methyl methacrylate, methyl acrylate, allyl acetate, diallyl phthalate diallyl succinate, diallyl adipate, diallyl sebacate, diethylene glycol bis (allyl carbonate), triallyl phosphate and other allyl esters, and vinyl toluene, diallyl chlorendate, diallyl tetrachlorophthalate, the lower aliphatic esters other than methyl of methacrylic and acrylic acids, ethylene glycol diacrylate, dimethacrylate, diethacrylate, etc. The monomer may be admixed in the polymer in an amount sufficient to produce a thermoset polymer and the admixture heated to an elevated temperature in the presence of a suitable catalyst to cross-link or cure the polymer. With proper catalyst systems such as cobalt naphthenate and methylethyl ketone peroxide, room temperature cures are obtained.

To prepare laminating resins, monomers which will copolymerize with the esters of the dibasic unsaturated acids or ether linkages may be used. These include styrene, vinyltoluene, diallyl phthalate, triallyl phosphate and other allyl esters, methylstyrenes, vinyl acetate, acrylate, and methacrylate esters, divinyl benzene, chlorostyrenes, etc.

From the foregoing discussion it is apparent that the unsaturated polymers of our invention differ markedly from prior art polymers. It has been known to provide unsaturation in the polymer chain or "backbone" by reacting compounds such as ethylene glycol and maleic acid. But in this invention, the backbone of the polymer molecule is provided by a phenol aldehyde condensation product, which is not ethylenically unsaturated. The unsaturation is provided in the side-chains that are reacted onto the base polymer. The reactivity of such a polymer molecule is different than that of molecules wherein the unsaturation is provided in the polymer chain.

In accordance with still other aspects of the invention, it is possible to employ the improved polymers of the invention in the preparation of plastic articles in general, reinforced plastic articles containing a reinforcement such as cloth, glass fibers in the form of roving individual glass fibers, etc., and laminates or other filled resin compositions. Surprisingly, such prepared materials exhibit vastly improved physical properties such as discussed above for the polymers of the invention. Suitable reinforcements or laminations for preparing the reinforced articles and laminates include textile fibers or cloth, glass fibers or cloth, roving, etc. Castings may be prepared from the improved polymers of the present invention and such products likewise have been found to exhibit the improved properties of the polymers discussed above to a surprising degree. In general, well known processes of the prior art may be used for preparing the above-mentioned plastic articles, reinforced plastic articles, laminates or other filled resin compositions, and castings, with the exception of substituting the improved polymer of the invention for that conventionally used. Usually, other changes in the process are not necessary. It is usually preferred that a thermoset polymer be present in the finished article.

The following are examples of suitable reinforcing media that can be used with the polymers of the invention: glass fibers, glass mats, glass cloth, synthetic fibers such as Orlon, mineral fibers such as asbestos, natural fibers such as cotton, silk and wool, and metallic fibers such as aluminum and steel.

Following are examples of fillers that can be used in the polymers of the invention: inorganic materials such as calcium carbonate, clay and pigments, and organic materials such as wood flour, cotton and rayon flock, sisal fibers, dyes and pigments.

The foregoing detailed description and the following specific examples are for purposes of illustration and are not intended as being limiting to the spirit or scope of the appended claims. Parts and percentages are by weight and temperatures are given in degrees centigrade unless otherwise specified.

EXAMPLE 1

This example illustrates the preparation of phenol novolak and hydroxy propylation.

Into a 10 gallon glass lined pressure reactor is charged 33.33 parts of phenol and 0.165 parts of oxalic acid. This is heated to 100°, and 17.8 parts of 37 percent formalin is pumped into the closed reactor. The pressure rose to 95 p.s.i. and the temperature to 100° and 46 degrees. The reaction was completed in 15 minutes. Water and free phenol were removed by distillation and finished at 175° and 29 inches vacuum. The yield was 28.5 parts of novolak of about 520 average molecular weight.

The reactor was sealed and 0.78 part of 50 percent NaOH was added followed by 17.4 parts of propylene oxide. The temperature was maintained at 150 to 170°, and held until the pressure dropped to zero p.s.i.g. Analysis of the product showed that <0.1 percent phenolic hydroxyl remained and the hydroxyl number was 334.

EXAMPLE 2

This example illustrates the preparation and hydroxy propylation of a dodecyl phenol novolak.

To 14.1 parts of phenol in a stainless steel kettle is added 0.28 part of boron trifluoride and 25.4 parts of tetrapropylene and the temperature maintained at 50° to 60° until the refractive index indicates completion of the reaction. The alkylated phenol is washed with hot water until free of acid. The crude dodecyl phenol is transferred to a 10 gallon glass lined pressure reactor and 0.2 part of oxalic acid is added. The reactor is heated to 100° and 9.72 parts of 37 percent formalin is added. After the reaction is completed the resin is dehydrated by distillation and reacted with 10.4 parts of 1,2-propylene oxide as described in Example 1. The finished resin has a hydroxyl number of 164 with 0.2 percent free phenolic hydroxyl.

EXAMPLE 3

The novolaks used in this example are the same as those in Examples 1 and 2, and derivatives were prepared using 13.20 and 10.56 parts respectively of ethylene oxide instead of propylene oxide. The reactions proceeded as noted in Examples 1 and 2 with the corresponding hydroxyl ethyl derivatives being produced.

EXAMPLE 4

319 parts (2.0 moles) of a phenol formaldehyde novolak condensation product which had been oxypropylated in the ratio of 1.03 moles of 1,2-propylene oxide per mol of phenolic hydroxyl in the novolak, substantially as described in Example 1 above, was heated to about 120°. To this were added gradually 200 parts (2.04 moles) of maleic anhydride maintaining the temperature of the mixture at below about 125°. The mass then was heated to and maintained at 150° for 15 minutes. Thereafter, 315 parts (2.09 moles) of phenoxypropanol-2 were added. A slow steady stream of nitrogen was passed over the mixture as it was slowly heated to and maintained at about 205°. At 185 degrees, water resulting from the esterification reaction commenced distilling from the mixture. After 2¼ hours the temperature had risen to 205°.

The acid number of the mass decreased to 30.0 after 3¾ hours and to 25.4 after 4½ hours. At this point the reaction was considered to be complete and the mass was placed under a partial vacuum, without further heating for 5 minutes. The resin was packed out and gradually solidified, on cooling, to a light amber rubbery solid having an acid number of 24.8.

Six hundred parts of this base resin was dissolved in 400 parts of styrene containing 0.1 part of hydroquinone to produce a light amber solution having a viscosity of 30.5 poises.

The solution had a SPI gel time of 3 minutes and 58 seconds and an exotherm of 176°.

A casting prepared from the above solution by adding 2 percent of a paste containing 50 percent of benzoyl peroxide in tricresyl phosphate and curing for 16 hours at 50° and 24 hours at 125° and a Barcol Hardness of 43.

The corrosion resistance of the polymer; i.e., the resistance to attack by chemical reagents, was demonstrated by immersing samples of the casting prepared above in various reagents for 96 hours at the boil, under reflux, and measuring the weight loss occasioned by this treatment. The results of this test is set out in Table I below.

TABLE I

| REAGENT | % WEIGHT CHANGE |
|---|---|
| ½% NaOH | 0.76 |
| 10% NaOH | 1.00 |
| 10% $H_2SO_4$ | 1.08 |
| $H_2O$ | 1.09 |

All samples were clouded after the 96 hour boil.

These results clearly indicate the excellent corrosion resistance of the styrenated polymer of this example, particularly the insensity of the polymer to caustic alkali.

EXAMPLE 5

This example illustrates an alternate procedure for preparing the polymers of this invention.

The half-ester of phenoxypropanol-2 and maleic anhydride was prepared by slowly adding 228 parts (2.33 moles) of maleic anhydride to 373 parts (2.45 moles) of phenoxypropanol-2 while maintaining the mixture at between 120° and 130°. The temperature was gradually increased to and maintained, for 1 hour, at 150° while a slow steady stream of nitrogen was passed over the mass.

Three hundred thirty seven parts (2.07 moles) of a novolak resin prepared as described in Example 1 above and which had been oxypropylated as described in Example 1 with 1.03 moles of 1,2-propylene oxide per mole of phenolic hydroxyl group in the resin, was heated to 150° and to it was added 518 parts (2.04 moles) of the phenoxypropanol-maleic acid half ester prepared as described above. A slow steady stream of nitrogen was passed over the reaction mixture as it was gradually heated to and maintained at about 200°.

The first water of esterification distilled from the mass at 185°. The temperature reached 200° after 2 ½ hours.

After 3 ½ hours, the acid number of the mass was 32.6. After 5 ¼ hours, the acid number was 22.1 and the mixture was quite viscous. The resin was packed out after 5 ½ hours and on cooling it was a clear amber rubbery solid having an acid number of 20.7.

A solution of 500 parts of this resin in 330 parts of styrene containing 0.1 part of hydroquinone was prepared. The solution was light amber in color and had a viscosity of 15.75 poises at 25°. The solution had a SPI gel time of 4 minutes 12 seconds and gave an exotherm of 166°.

A plate casting prepared as described in Example 4 had a Barcol Hardness of 40-41.

The excellent corrosion resistance of the copolymerized product as determined by the 96 hour boil test described in Example 4 above is evidenced by the data set out in Table II below

TABLE II

| REAGENT | % WEIGHT LOSS |
| --- | --- |
| ½% NaOH | 0.93 |
| 10% NaOH | 0.57 |
| 10% H$_2$SO$_4$ | 0.62 |
| H$_2$O | 1.09 |

EXAMPLE 6

A mixture of 1,862 parts of a phenoxy-propanol-2-maleic acid half ester, prepared as described in Example 5 above by reacting phenoxy propanol-2 and maleic anhydride in the molar ratio of 1.05 molar proportions of the monofunctional alcohol with 1.0 molar proportion of the anhydride, with 1,250 parts of an oxypropylated novolak resin, prepared as described in Example 1 and in which 1.05 moles of 1,2-propylene oxide per mole of phenolic hydroxyl group in the novolak resin were reacted. The mixture was heated to 185° while passing a slow steady stream of nitrogen through the mixture. After 2 hours, the temperature of the mass was increased to 200° and held thereat for 11 hours. The acid number of the mass, after 7 ½ hours at 200° had decreased to 20.1 and after 11 hours was 14.4.

The mixture was cooled to below 150° and 0.9 part of toluene hydroquinone was added followed by the addition of 2,250 parts of styrene.

The resultant product was an amber liquid having a viscosity of 210 centipoises. The solution had an S.P.I. gel time of 10 minutes and 23 seconds.

A ⅛ inch laminate was prepared from three plies of 2 ounce glass mat using the above prepared composition as a binder therefor. The laminate was cured using 2 percent of a paste containing 50 percent benzoyl peroxide in tricresyl phosphate as catalyst, for ten minutes at 80° and 10 minutes at 120 degrees and at a pressure of 25 p.s.i.

The properties of the laminate were:

| | |
| --- | --- |
| Flexural Strength, p.s.i. | 31,560 |
| Tensile Strength, p.s.i. | 16,301 |
| Regular Impact, imp/in* | 9.32 |
| Modulus Flexure | 1.01×10$^6$ |
| Compressive Strength, p.s.i. | 12,657 |
| % Elongation at Break | 1.97 |
| Barcol Hardness | 50 |
| % Glass in Laminate | 35.3 |
| * ASTM D-256 | |

The excellent corrosion resistance of the copolymerized product as determined by the 96 hour boil test described in Example 4 above is indicated by the data set out in Table III below.

TABLE III

| REAGENT | % WEIGHT LOSS |
| --- | --- |
| ½% NaOH | 0.49 |
| 10% NaOH | 0.25 |
| 10% H$_2$SO$_4$ | 0.39 |
| H$_2$O | 0.58 |

EXAMPLE 7

This example is included to provide a comparison between the resin compositions of the invention and one in which the oxyalkylated novolak component is replaced by another type of polyol component.

The maleic acid, phenoxy propanol half ester was prepared by slowly adding 916 parts (9.35 moles) of maleic anhydride to 1,317 parts (9.48 moles) of phenoxy-propanol- 2 at 130°. Thereafter 460 parts (3,43 mols) of trimethylol propane were added to the mass and the temperature was increased to 180° while a slow steady stream of nitrogen was passed through the mixture. The mixture was heated at 180° for 2 hours and then it was heated to and maintained at 195°. The acid number, after 11 ½ hours was 25 and after 18 ½ hours, 14.8. The mass was cooled to below 150° and after the addition of 0.25 parts of toluene hydroquinone, 1,482 parts of styrene were charged.

The resultant solution had a amber color, and a S.P.I. gel time of 4 minutes and 24 seconds.

A ⅛ inch glass mat laminate was prepared as in Example 6 above using the above prepared polymer solution as binder. The laminate had the following physical properties.

| | |
| --- | --- |
| Flexural Strength, p.s.i. | 21,778 |
| Tensile Strength, p.s.i. | 11,849 |
| Regular Impact, imp./in | 7.73 |
| Modulus of Flexure | 9.64×10$^5$ |
| Compressive Strength, p.s.i. | 24,898 |
| % Elongation at Break | 1.66 |
| Barcol Hardness | 47 |
| % Glass in Laminate | 32.3 |

The results of the accelerated corrosion test ("96 hour boil") performed as described in Example 4 above are set out in Table IV below.

TABLE IV

| REAGENT | % WEIGHT LOSS |
| --- | --- |
| ½% NaOH | 0.58 |
| 10% NaOH | 1.48 |
| 10% H$_2$SO$_4$ | 0.36 |
| H$_2$O | 0.57 |

These comparative results indicate that although the resins of Examples 6 and 7 had approximately the same acid numbers, (14.4 and 14.8), the product of Example 6, when copolymerized had somewhat better resistance to aqueous caustic soda solutions. Moreover the laminate prepared from the product of Example 6 had significantly better flexural and tensile strength.

An invention has been described in the above specification and illustrated by several descriptive examples which include the best known manner of carrying out the process of our invention. It will be understood, however, that various modifications in the embodiments disclosed herein can be made, as will be obvious to those skilled in the art, without departing from the spirit of the invention.

What is claimed is:

1. A thermoset polymer composition comprising the co-polymerized product of styrene and a thermoplastic polymer composition having substantially no free carboxylic acid groups, said thermoplastic polymer comprising a mixed polyester of an alpha beta ethylenically unsaturated dicarboxylic acid compound being esterified on the one side of a monofunctional aryloxy alkanol, said alkanol moiety having from two to three carbon atoms, and on the other side by an oxyalkylated polyfunctional novolak resin, which resin contains less than about 0.5 percent by weight of free phenolic hydroxyl groups, said thermoplastic polymer composition being soluble in styrene at ambient temperature.

2. The polymer composition of claim 1 wherein the ethylenically unsaturated dicarboxylic acid is maleic acid.

3. The thermoset polymer composition of claim 2 in which the aryloxy alkanol is phenoxy propanol-2.

4. The polymer composition of claim 1 which consists essentially of the mixed polyesters of maleic acid being esterified on one side by phenoxy propanol-2 and on the other side by the oxypropylated poly-functional novolak resin obtained by condensing phenol with formaldehyde and reacting the resultant novolak composition with 1,2-propylene oxide.

5. A process for the preparation of thermoset polymer compositions which comprises
   1. reacting a polyfunctional oxyalkylated novolak with an alpha beta ethylenically unsaturated dicarboxylic acid, anhydride or diacid halide in such molecular proportions as to form a monoester of the dicarboxylic acid,
   2. reacting the monoester of the dicarboxylic acid with about an equimolecular proportion of a monofunctional aryloxy alkanol, said alkanol moiety having from two to three carbon atoms, to produce a thermoplastic mixed polyester composition having an acid number of less than about 30 and which is soluble in styrene at ambient temperatures, and
   3. copolymerizing said mixed polyester composition with styrene.

6. The process of claim 5 wherein the alpha beta ethylenically unsaturated dicarboxylic anhydride is maleic anhydride.

7. The process of claim 5 wherein the monofunctional alcohol is phenoxy-propanol-2.

8. The process of claim 6 wherein the monofunctional alcohol is phenoxypropanol-2.

9. The process of claim 5 wherein from about 0.9 to about 1.2 moles of the monofunctional alcohol per mole of dicarboxylic acid are used.

10. The process of claim 9 wherein from about 1.0 to about 1.1 moles of monofunctional alcohol per mole of dicarboxylic acid are used.

11. The process of claim 5 wherein the mixed polyester product separated from the reaction has an acid number of less than about 25.

12. A process for the preparation of thermoset polymer compositions which comprises
   1. reacting a monofunctional aryloxy alkanol, said alkanol moiety having two to three carbon atoms, with an alpha beta ethylenically unsaturated dicarboxylic acid, anhydride or diacid halide in such molar proportions as to form a monoester of the dicarboxylic acid compound,
   2. reacting said monoester of the dicarboxylic acid compound with a polyfunctional oxyalkylated novolak resin which contains less than about 0.5 percent by weight of free phenolic hydroxyl groups, thereby forming a thermoplastic mixed polyester composition having an acid number of less than about 30 and which is soluble in styrene at ambient temperatures, and
   3. co-polymerizing said mixed polyester composition with styrene.

13. The process of claim 12 wherein the monofunctional alcohol is phenoxypropanol-2.

14. The process of claim 12 wherein from about 0.9 to about 1.2 moles of the monofunctional alcohol per mole of the unsaturated dicarboxylic acid reactant are used.

15. The process of claim 14 wherein from about 1.0 to about 1.1 moles of the monofunctional alcohol per mole of the unsaturated dicarboxylic acid reactant are used.

16. The process of claim 12 wherein the unsaturated dicarboxylic acid reactant used is maleic anhydride.

17. The process of claim 12 wherein the novolak resin is a phenolformaldehyde, condensation product.

18. The process of claim 12 wherein the polyester composition separated has an acid number of less than about 21.

19. The process of claim 18 wherein the polyester composition has an acid number of less than about 15.

20. The process of claim 12 wherein from about 0.9 to about 1.2 molar proportions of phenoxy propanol-2 is reacted with about one molar proportion of maleic anhydride and the resulting monoester is reacted with the polyfunctional oxypropylated novolak resin obtained by reacting the product of the reaction of phenol with formaldehyde with 1,2-propylene oxide.

* * * * *